(12) United States Patent
Dong

(10) Patent No.: US 8,892,078 B2
(45) Date of Patent: Nov. 18, 2014

(54) METHOD AND SYSTEM FOR REPRESENTING MULTIMEDIA RING TONE FOR IM

(75) Inventor: Hao Dong, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 172 days.

(21) Appl. No.: 13/258,274

(22) PCT Filed: May 11, 2010

(86) PCT No.: PCT/CN2010/072610
§ 371 (c)(1),
(2), (4) Date: Apr. 13, 2012

(87) PCT Pub. No.: WO2010/145349
PCT Pub. Date: Dec. 23, 2010

(65) Prior Publication Data
US 2012/0190347 A1 Jul. 26, 2012

(30) Foreign Application Priority Data

Oct. 15, 2009 (CN) .......................... 2009 1 0236009

(51) Int. Cl.
*H04M 3/42* (2006.01)
*H04W 24/00* (2009.01)
*H04W 4/00* (2009.01)
*H04L 12/58* (2006.01)

(52) U.S. Cl.
CPC .............. *H04L 12/581* (2013.01); *H04L 51/04* (2013.01); *H04L 12/587* (2013.01)
USPC ...................... 455/414.1; 455/456.1; 455/466; 370/353; 701/51; 705/4; 709/206; 709/217

(58) Field of Classification Search
CPC .................... H04L 29/08108; H04M 2207/18; H04W 4/02

USPC .................. 455/414.1, 456.1, 466; 370/353; 709/206, 217; 705/4; 701/51
See application file for complete search history.

(56) References Cited

U.S. PATENT DOCUMENTS 7,340,503 B2 * 3/2008 Washburn ...................... 709/206
7,353,258 B2 * 4/2008 Washburn ...................... 709/206
(Continued)

FOREIGN PATENT DOCUMENTS

CN 101022427 A 8/2007
CN 101137152 A 3/2008
(Continued)

OTHER PUBLICATIONS

International Search Report in international application No. PCT/CN2010/072610, mailed on Aug. 12, 2010.
(Continued)

*Primary Examiner* — William D Cumming
(74) *Attorney, Agent, or Firm* — Oppedahl Patent Law Firm LLC

(57) ABSTRACT

A method and system for presenting an MRT for an IM is provided. In an Instant Messaging Application Server (IM-AS), an MRT presenting rule of the IM is set for a user; when the IM-AS receives an IM from the user, the IM-AS determines, according to the MRT presenting rule of the IM, whether an MRT is to be presented for a receiver of the IM, selects an MRT to be presented from MRT resources of the user when the MRT needs to be presented, and sends address information of the MRT to be presenting in a Resource Server (RS) along with the IM to the IM receiver; and the IM receiver downloads the MRT from the RS according to the address information and presents the MRT.

14 Claims, 3 Drawing Sheets

(56) References Cited

U.S. PATENT DOCUMENTS

| | | |
|---|---|---|
| 7,409,384 B2 | 8/2008 | Szeto et al. |
| 7,849,154 B2 * | 12/2010 | Grecco et al. ................ 709/217 |
| 8,027,335 B2 * | 9/2011 | Ansari et al. .................. 370/353 |
| 2005/0234885 A1 | 10/2005 | Szeto et al. |
| 2007/0060171 A1 * | 3/2007 | Sudit et al. ................ 455/456.1 |
| 2008/0065732 A1 | 3/2008 | Kulkarni et al. |
| 2008/0288467 A1 | 11/2008 | Szeto et al. |
| 2011/0078279 A1 * | 3/2011 | Grecco et al. ................ 709/217 |
| 2012/0190347 A1 * | 7/2012 | Dong ......................... 455/414.1 |
| 2012/0197669 A1 * | 8/2012 | Kote et al. ......................... 705/4 |
| 2012/0226421 A1 * | 9/2012 | Kote et al. ...................... 701/51 |
| 2013/0084902 A1 * | 4/2013 | de Ruiter ...................... 455/466 |

FOREIGN PATENT DOCUMENTS

| | | |
|---|---|---|
| CN | 101222680 A | 7/2008 |
| CN | 101568193 A | 10/2009 |
| JP | 2004537943 A | 12/2004 |
| KR | 20060086662 A | 8/2006 |

OTHER PUBLICATIONS

English Translation of the Written Opinion of the International Search Authority in international application No. PCT/CN2010/072610, mailed on Aug. 12, 2010.

Session Initiation Protocol (SIP) Extension for Instant Messaging Dec. 1, 2002.

RFC 3261; SIP: Session Initiation Protocol Jun. 1, 2002.

Supplementary European Search Report in European application No. 10788745.7, mailed on Nov. 29, 2012.

* cited by examiner

METHOD AND SYSTEM FOR REPRESENTING MULTIMEDIA RING TONE FOR IM

TECHNICAL FIELD

The disclosure relates to a technique for presenting a Multimedia Ring Tone (MRT) for an Instant Message (IM), and in particular to a method and system for presenting an MRT for an IM.

BACKGROUND

With the development of the communication technology, various types of message services have emerged to meet the communication requirements of users. The message services include a Short Message Service (SMS), a Multimedia Message Service (MMS) and an IM service. Among the message services above, the IM service is initially applied to the internet field and then gradually extended to the telecommunication field; as operators construct their networks and capabilities of the mobile terminals are enhanced, the IM service has become an important means for communication between users; and users' demand for the IM service also leads to a rapid development of the IM service.

On the other hand, in an MRT service, after a calling user calls a called user and before the called user answers the call, the terminal of the called user presents the MRT resources obtained from the network to the called user. The MRT resources may include images, texts, videos, audios and other resources preset by the calling user, or the combination thereof. At present, the MRT service is mainly used for enabling a called user to experience, before the call is formally established, personalized MRT resources set by the calling user.

Meanwhile, a user, when sending an IM to his/her receiver, may wish to present some personalized MRT resources set by himself/herself, such as texts, images or his/her vCard, to the message receiver, especially when the first message among message interactions performed during a period of time is sent. In addition, the user may set different resources to be presented according to different moments, the emotions of the user and different IM receivers, such that good service experiences may be brought to the user.

Unfortunately, currently, the MRT service has not been applied to the IM domain. The above service demands have not been developed, and no technical solution for presenting an MRT service to an IM receiver has been proposed yet.

SUMMARY

In view of the above, the main purpose of the disclosure is to provide a method and system for presenting an MRT for an IM, which is capable of presenting the set MRT to a receiver of the IM in a mode set by a user.

In order to achieve the purpose above, the technical solution of the disclosure is implemented by a method for presenting an MRT for an IM. In the method, an MRT presenting rule of the IM for a user is set in an Instant Messaging Application Server (IM-AS); when the IM-AS receives an IM from the user, the IM-AS determines, according to the MRT presenting rule of the IM, whether an MRT needs to be presented to a receiver of the IM, selects an MRT to be presented from MRT resources of the user when the MRT needs to be presented, and sends address information of the MRT to be presented in a Resource Server (RS) along with the IM to the IM receiver; and the IM receiver downloads the MRT from the RS according to the address information of the MRT resources and presents the MRT.

Preferably, the MRT presenting rule of the IM may include: setting an object table for presenting MRTs, and when the IM receiver belongs to objects in the object table, presenting the MRT to the IM receiver; or, presenting the MRT to all IM receivers of the user.

Preferably, the MRT resources may include at least one of audio files, video files, text files, images and vCards.

Preferably, the MRT presenting rule of the IM may include: when the MRT resources of the user contain two or more MRTs, selecting an MRT to be presented to the IM receiver in a cycle order in which the MRT resources are stored; or, when the MRT resources of the user contain two or more MRTs, selecting an MRT to be presented to the IM receiver in the MRT resources in a random order.

Preferably, the MRT resources may contain the MRTs uploaded to an MRT Server (MRTS) by the user; or, the MRT resources may contain the MRTs selected by the user from the MRT resources provided by the MRTS; or, the MRT resources may contain the MRTs uploaded to the MRTS by the user and the MRTs selected from the MRT resources provided by the MRTS.

The technical solution of the disclosure is also implemented by a system for presenting an MRT for an IM. The system includes a setting unit configured to set in an IM-AS an MRT presenting rule of the IM for a user; a first receiving unit located in the IM-AS and configured to receive the IM from the user; a determining unit located in the IM-AS and configured to determine, according to the MRT presenting rule of the IM, whether an MRT is to be presented to a receiver of the IM, and trigger a selecting unit when the MRT needs to be presented; a selecting unit located in the IM-AS and configured to select an MRT to be presented from the MRT resources of the user; a sending unit located in the IM-AS and configured to send address information of the MRT to be presented in an RS along with the IM to the IM receiver; a second receiving unit located in the IM receiver and configured to receive the address information of the MRT to be presented and the IM; and an MRT presenting unit located in the IM receiver and configured to download the MRT from the RS according to the address information of the MRT resources and to present the MRT.

Preferably, the MRT presenting rule of the IM set by the setting unit may include: setting an object table for presenting MRTs, and when the IM receiver belongs to objects in the object table, presenting the MRT to the IM receiver; or, presenting the MRT to all IM receivers of the user.

Preferably, the MRT resources may include at least one of audio files, video files, text files, images and vCards.

Preferably, the MRT presenting rule set by the setting unit may include: when the MRT resources of the user contain two or more MRTs, selecting an MRT to be presented to the IM receiver in a cycle order in which the MRT resources are stored; or, when the MRT resources of the user contain two or more MRTs, selecting an MRT to be presented to the IM receiver in the MRT resources in a random order.

Preferably, the MRT resources may contain the MRTs uploaded to an MRT Server (MRTS) by the user; or, the MRT resources may contain the MRTs selected by the user from the MRT resources provided by the MRTS; or, the MRT resources may contain the MRTs uploaded to the MRTS by the user and the MRTs selected from the MRT resources provided by the MRTS.

In the disclosure, an MRT presenting rule of an IM is set in an IM-AS for a user and the MRT resources of the user is stored in an RS; when the IM-AS determines to present an MRT to a receiver of the IM, the IM and the address information of the determined MRT to be presented in the RS are sent to the IM receiver; the user terminal of the IM receiver downloads the corresponding MRT from the RS according to the address information of the MRT and presents the MRT to the IM receiver. The disclosure provides a good service experience to the IM user.

DETAILED DESCRIPTION

Figure 1:
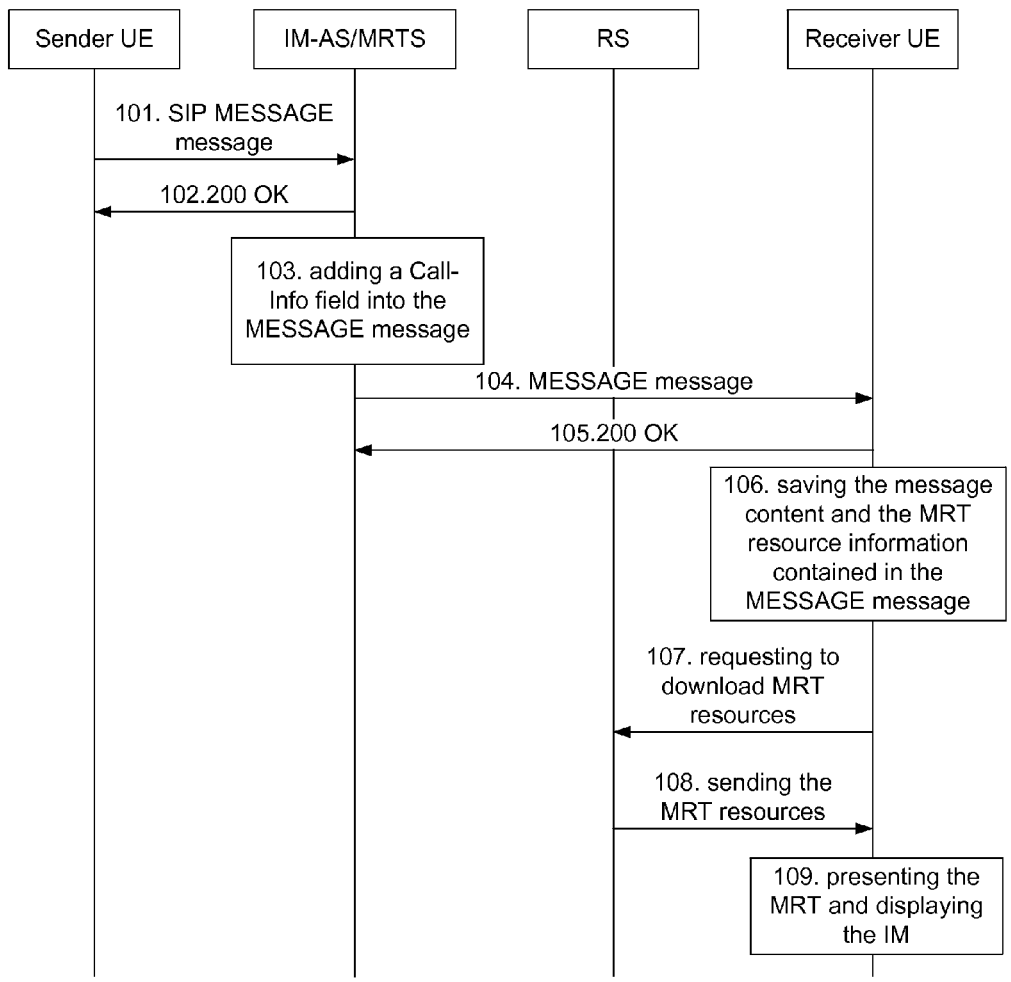
FIG. 1 shows a flowchart of Embodiment 1 of the method for presenting the MRT for an IM according to the disclosure.

The principle of the disclosure lies in that: through setting, in an Instant Messaging Application Server (IM-AS), an MRT presenting rule of the IM for a user and storing the MRT resources of the user in an RS, when the IM-AS determines to present an MRT to a receiver of the IM, the IM and the address information of the determined MRT to be presented in the RS are sent to the IM receiver; the user terminal of the IM receiver downloads the corresponding MRT from the RS according to the address information of the MRT and presents the MRT to the IM receiver. The disclosure provides a good service experience to the IM user.

The disclosure will further be described in detail with reference to the accompanying drawings to clarify the purpose, technical solutions and advantages of the disclosure.

In the technical solution of the disclosure, the equipment or server involved in MRT presenting mainly may include an IM-AS, an MRTS, an RS, User Equipment (UE) of IM sender and receiver, and may further include some necessary equipment such as an access network or a core network for signaling and media bearing, wherein the IM sender UE is a UE used by the IM sender; the user transmits an IM through this UE; wherein the IM receiver UE is a UE used by the IM receiver, the user receives an IM through this UE, then the IM receiver UE downloads a corresponding MRT from the RS according to the address information of the MRT when receiving the IM and the address information of the MRT to be presented, and presents the MRT to the IM receiver; the IM-AS is the core equipment for implementing the IM service of the disclosure and is used for forwarding the IM between the IM users; the MRTS is used for storing the setup information of the MRT resources of the IM user (such as the specific identifier information of the MRT resources of the user, the number of the MRTs of the user, the attributes of the MRT and so on) and is used for implementing the IM service having MRT function together with the IM-AS; in the disclosure, the MRTS also can be integrated with the IM-AS into an equipment; the RS is used for storing the specific MRT resources of the IM user, receiving the download request of the IM UE and providing the download service of the MRT resource.

In the system provided by the disclosure for implementing the IM service having MRT function, the MRT resources customized by the IM sender is stored in advance into an RS which supports an MRT download capability and is accessible by the IM receiver UE; when a user transmits an IM, the IM-AS transmits the storage address of the MRT resources customized by the sender to the IM receiver UE, then the IM receiver UE downloads the MRT resources customized by the IM sender from the RS, and presents the MRT resources customized by the IM sender to the receiver user when message arrival information is needed to be prompted to the receiver terminal.

Before the MRT present method according to the disclosure is implemented, it is necessary for the IM sender user to set the preferred MRT resources and the present rules thereof in the IM-AS/MRTS, wherein the MRT resources may include the resources type, the specific resource content and the Uniform Resource Identifier (URI) of the resources. The MRT resources may include at least one of audio files, video files, text files, images and vCards. The MRT presenting rules of IM includes: setting an object table for presenting MRTs, and when the IM receiver belongs to objects in the object table, presenting the MRT to the IM receiver; or, presenting the MRT to all IM receivers. The MRT presenting rules of the IM further includes: when the MRT resources of the IM sender user contain two or more MRTs, selecting an MRT to be presented to the IM receiver in a cycle order in which the MRT resources are stored; or, when the MRT resources of the IM sender user contain two or more MRTs, selecting an MRT to be presented to the IM receiver in the MRT resources in a random order. The MRT resources of the IM sender user are stored in the RS; the MRT resources contain the MRT uploaded to the MRTS by the IM sender user; or, the MRT resources contain the MRT selected by a user from the MRT resources provided by the MRTS; or, the MRT resources contain the MRT uploaded to the MRTS by the user and the MRT selected from the MRT resources provided by the MRTS.

The disclosure is based on the existing IM service specifications, there is no need to expand the interactive message format and field and deployment can be performed quickly without influencing the interaction between IM services. Moreover, the disclosure can bring to users good service experiences. The essence of the technical solution of the disclosure is illustrated below in detail by way of specific examples.

FIG. 1 shows a flowchart of Embodiment 1 of the method for presenting the MRT for an IM according to the disclosure. As shown in FIG. 1, in the embodiment, an IM user sends an IM in a Page mode and sends the message by using the Session Initiation Protocol (SIP) MESSAGE mode; the message size in this mode does not exceed 1300 bytes. The method for presenting the MRT for the IM in the embodiment may include the following steps.

Step 101: the IM sender UE transmits an SIP MESSAGE message to the IM-AS/MRTS, wherein the message contains the IM that the user expects to transmit. When the IM-AS and the MRTS are set in the messaging system separately, the IM is directly sent to the IM-AS. Information exchange may be performed between IM-ASs. The IM-ASs may inquire the MRT presenting rule set by the IM sender user and the set information of the MRT resources in the MRTS.

Step 102: the IM-AS/MRTS transmits a response message 200 OK of the MESSAGE to the IM sender UE. The IM-AS/MRTS confirms to the IM sender UE that it has received the IM sent from the IM sender UE.

Step 103: the IM-AS/MRTS inquires the MRT presenting rules set by the user and adds a Call-Info field into the MESSAGE message, wherein the field contains the information of the MRT resources.

Subsequently, the IM receiver downloads the corresponding MRT according to the MRT information in the message and presents the MRT to the IM receiver.

In the disclosure, the types of the MRT resources may be image, text or vCard designed by the user. The Call-Info field is required to contain the address information of the MRT resources in the RS, such as the URI information, and the resource type is marked in the purpose parameter, wherein the icon denotes the image resources usable as the sender icon, the info denotes the description information of the sender, the card denotes the vCard information of the sender. The resource information contained in the IM sent once may be one of the three types above or the combinations thereof.

Subsequently, the IM-AS/MRTS only needs to present the MRT to the IM receiver according to the MRT presenting rule set by the IM sender. The specific MRT presenting rule, which has been described in the foregoing part of the embodiment, will be omitted here. The MRT presenting rule in the technical solution of the disclosure can fully meet the personalized requirement of the IM sender and well guarantee the service experience of the IM sender. Moreover, a good corresponding experience may be provided to the IM receiver.

Step 104: the IM-AS/MRTS sends to the IM receiver UE the MESSAGE message in which a Call-Info field is added.

Step 105: the IM receiver UE returns a response message 200 OK of the MESSAGE to confirm that it has received the IM forwarded by the IM-AS/MRTS.

Step 106: the IM receiver UE saves the message content and the MRT resource information contained in the received MESSAGE.

Step 107: the IM receiver UE extracts the address information of the MRT from the MRT resource information, such as the URI, and requests to download the MRT resources from the corresponding RS according to the address information of the MRT.

Step 108: the RS sends the MRT resources to the IM receiver UE.

Here, when the IM receiver UE supports an internet service, in step 107 and step 108, MRT resources can be downloaded by using the Hyper Text Transfer Protocol (HTTP) mode.

Step 109: after downloading the corresponding MRT, the IM receiver UE prompts to the user that it has received a new IM, and then presents the MRT resources according to the MRT type; or displays the received IM while presenting the MRT; or displays the received IM after the IM receiver user responds to the MRT.

Figure 2:
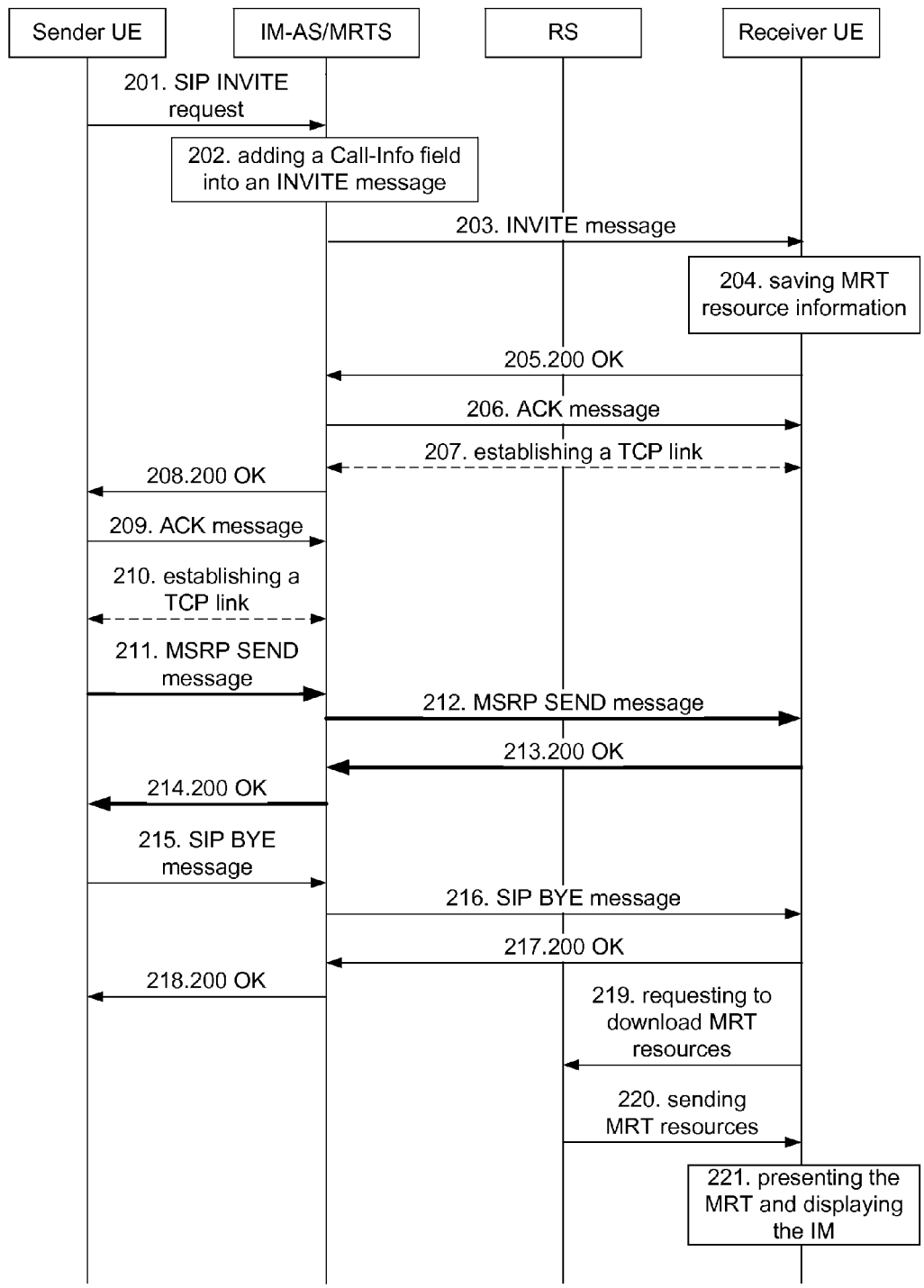
FIG. 2 shows a flowchart of Embodiment 2 of the method for presenting the MRT for an IM according to the disclosure.

FIG. 2 shows a flowchart of Embodiment 2 of the method for presenting the MRT for the IM according to the disclosure. As shown in FIG. 2, in the embodiment, the IM user sends an IM in a session mode; before the IM is sent, a session has to be established; after the session is established, the message is transferred by using the Message Session Relay Protocol (MSRP), which is applicable for big message (exceeding 1300 bytes) or file transmission. The method for presenting the MRT for the IM in the embodiment may include the following steps.

Step 201: an IM sender UE sends an SIP INVITE request to the IM-AS/MRTS to perform an MSRP media negotiation for the message transmission. When the IM-AS and the MRTS are set in the messaging system separately, the SIP INVITE request is directly sent to the IM-AS. Information exchange may be performed between IM-ASs. The IM-ASs may inquire the MRT presenting rule set by the IM sender user and the set information of the MRT resources in the MRTS.

Step 202: the IM-AS/MRTS inquires the MRT resources set by the IM sender user, adds a Call-Info field into the INVITE message, wherein the field contains the information of the MRT resources.

The types of the MRT resources may be image, text or vCard designed by the user. The Call-Info field is required to contain the address information of the MRT resources in the RS, such as the URI information, and the resource type is marked in the purpose parameter, wherein the icon denotes the image resources usable as the sender icon, the info denotes the description information of the sender, the card denotes the vCard information of the sender. The resource information contained in the IM sent once may be one of the three types above or the combinations thereof.

In step 202, the IM-AS/MRTS only needs to present the MRT to the IM receiver according to the MRT presenting rule set by the IM sender. The specific MRT presenting rule, which has been described in the foregoing part of the embodiment, will be omitted here. The MRT presenting rule in the technical solution of the disclosure can fully meet the personalized requirement of the IM sender and well guarantee the service experience of the IM sender. Moreover, a good corresponding experience may be provided to the IM receiver.

Step 203: the IM-AS/MRTS sends an INVITE message in which a Call-Info field is added to the IM receiver UE.

Step 204: the IM receiver UE saves the MRT resource information contained in the received INVITE message.

Step 205: the IM receiver UE returns a 200 OK message of the INVITE; and the MSRP negotiation between the IM-AS/MRTS and the receiver UE is completed.

Step 206: the IM-AS/MRTS sends an ACK message to the IM receiver UE.

Step 207: the IM-AS/MRTS establishes a Transmission Control Protocol (TCP) link with the IM receiver UE.

Step 208: the IM-AS/MRTS returns the 200 OK message of the INVITE to the IM sender UE; the MSRP negotiation between the IM-AS/MRTS and the IM sender UE is completed.

Step 209: the IM sender UE returns an ACK message to the IM-AS/MRTS.

Step 210: the IM sender UE establishes a TCP link with the IM-AS/MRTS.

Step 211: the IM sender UE sends the generated IM to the IM-AS/MRTS through an MSRP SEND message.

Step 212: the IM-AS/MRTS sends an IM to the IM receiver UE through an MSRP SEND message.

Step 213: the IM receiver UE returns an MSRP 200 OK response to the IM-AS/MRTS.

Step 214: the IM-AS/MRTS sends the MSRP 200 OK response to the IM sender UE.

Step 215: the IM sender UE sends an SIP BYE message to the IM-AS/MRTS to end the session.

Step 216: the IM-AS/MRTS forwards the SIP BYE message to the IM receiver UE to end the session.

Step 217: the IM receiver UE sends an SIP 200 OK (BYE) to the IM-AS/MRTS.

Step 218: the IM-AS/MRTS sends the SIP 200 OK (BYE) to the IM sender UE.

Step 219: the IM receiver UE extracts the address information of the MRT resource, such as the URI of the MRT, and requests to download the MRT resources from the RS according to the address information of the MRT.

Step 220: the RS sends the MRT resources to the receiver UE.

In the embodiment, step 219 and step 205 can be executed concurrently.

Step 221: after downloading the MRT, the IM receiver UE prompts to the user that it has received a new IM, and presents the MRT resources according to the MRT type, or presents the received IM while presenting the MRT, or presents the received IM after the IM receiver user responds to the MRT.

Figure 3:
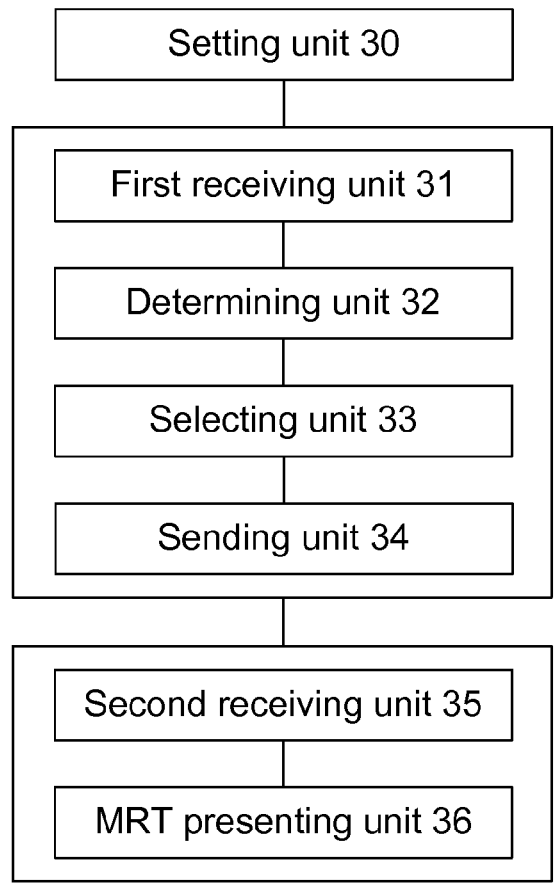
FIG. 3 shows a structural diagram of the system for presenting the MRT for an IM according to the disclosure.

FIG. 3 shows a structural diagram of the system for presenting the MRT for the IM according to the disclosure. As shown in FIG. 3, the system for presenting the MRT for the IM according to the disclosure includes: a setting unit 30, a first receiving unit 31, a determining unit 32, a selecting unit 33, a sending unit 34, a second receiving unit 35 and an MRT presenting unit 36, wherein the setting unit 30 is configured to set in an IM-AS an MRT presenting rule of the IM for a user; the first receiving unit 31 is located in the IM-AS and is configured to receive the IM from the IM sender user; the determining unit 32 is located in the IM-AS and is configured to determine, according to the MRT presenting rule of the IM, whether an MRT is to be presented for the IM receiver, and to trigger the selecting unit 33 when the MRT needs to be presented; the selecting unit 33 is located in the IM-AS and is configured to select an MRT to be presented from the MRT resources of the user; the sending unit 34 is located in the IM-AS and is configured to send address information of the MRT to be presented in an RS along with the IM to the IM receiver; the second receiving unit 35 is located in the IM receiver and is configured to receive the address information of the MRT to be presented and the IM; the MRT presenting unit 36 is located in the IM receiver and is configured to download the MRT from the RS according to the address information of the MRT resources and present the MRT. The MRT presenting rule of the IM set by the setting unit 30 may include: setting an object table for presenting MRTs, and when the IM receiver belongs to objects in the object table, presenting the MRT to the IM receiver; or, presenting the MRT to all IM receivers of the user. The MRT resources may include at least one of audio files, video files, text files, images and vCards. The MRT presenting rule set by the setting unit may include: when the MRT resources of the user contain two or more MRTs, selecting an MRT to be presented to the IM receiver in a cycle order in which the MRT resources are stored; or, when the MRT resources of the user contain two or more MRTs, selecting an MRT to be presented to the IM receiver in the MRT resources in a random order. The MRT resources contain the MRTs uploaded to the MRT MRTS by the user; or, the MRT resources contain the MRT selected by the user from the MRT resources provided by the MRTS; or, the MRT resources contain the MRT uploaded to the MRTS by the user and the MRT selected from the MRT resources provided by the MRTS.

As the skilled in the art will appreciate, the system for presenting the MRT for the IM as shown in FIG. 3 is arranged to implement the aforementioned method for presenting the MRT for the IM. The functions of the processing units as shown in the figure can be understood with reference to relevant descriptions of the aforementioned method. The functions of the processing units in the system as shown in FIG. 3 can be implemented through either programs running on a processor or specific logic circuits.

The above are only the preferable embodiments of the disclosure and are not intended to limit the scope of the disclosure.

The invention claimed is:

1. A method for presenting a Multimedia Ring Tone (MRT) for an Instant Message (IM), comprising:
   setting for a user, in an Instant Message Application Server (IM-AS), an MRT presenting rule of the IM;
   when the IM-AS receives the IM from the user, and determines, according to the MRT presenting rule of the IM, that an MRT needs to be presented to a receiver of the IM, selecting, by the IM-AS, an MRT to be presented from MRT resources of the user, and sending, by the IM-AS, address information of the MRT to be presented in a Resource Server (RS) along with the IM to the IM receiver; and
   downloading, by the IM receiver, the MRT from the RS according to the address information of the MRT resources; and presenting, by the IM receiver, the MRT.

2. The method according to claim 1, wherein the MRT presenting rule of the IM comprises:
   setting an object table for presenting MRTs, and when the IM receiver belongs to objects in the object table, presenting the MRT to the IM receiver; or
   presenting the MRT to all IM receivers of the user.

3. The method according to claim 1, wherein the MRT resources comprise at least one of audio files, video files, text files, images and vCards.

4. The method according to claim 3, wherein the MRT presenting rule of the IM comprises:
   when the MRT resources of the user contain two or more MRTs, selecting an MRT to be presented to the IM receiver in a cycle order in which the MRT resources are stored; or
   when the MRT resources of the user contain two or more MRTs, selecting an MRT to be presented to the IM receiver in the MRT resources in a random order.

5. The method according to claim 1, wherein
   the MRT resources contain MRTs uploaded to an MRT Server (MRTS) by the user; or
   the MRT resources contain MRTs selected by the user from the MRT resources provided by the MRTS; or
   the MRT resources contain the MRTs uploaded to the MRTS by the user and the MRTs selected from the MRT resources provided by the MRTS.

6. A system for presenting a Multimedia Ring Tone (MRT) for an Instant Message (IM), comprising: a setting unit, a first receiving unit, a determining unit, a selecting unit, a sending unit, a second receiving unit and an MRT presenting unit, wherein
   the setting unit is configured to set for a user, in an Instant Message Application Server (IM-AS), an MRT presenting rule of the IM;
   the first receiving unit is located in the IM-AS and is configured to receive the IM from the user;
   the determining unit is located in the IM-AS and is configured to trigger the selecting unit when determining according to the MRT presenting rule of the IM that the MRT needs to be presented;
   the selecting unit is located in the IM-AS and is configured to select an MRT to be presented from the MRT resources of the user;
   the sending unit is located in the IM-AS and is configured to send address information of the MRT to be presented in an Resource Server (RS) along with the IM to an IM receiver;
   the second receiving unit is located in the IM receiver and is configured to receive the address information of the MRT to be presented and the IM;
   the MRT presenting unit is located in the IM receiver and is configured to download the MRT from the RS according to the address information of the MRT resources and to represent the MRT.

7. The system according to claim 6, wherein the MRT presenting rule of the IM set by the setting unit comprises:
   setting an object table for presenting MRTs, and when the IM receiver belongs to objects in the object table, presenting the MRT to the IM receiver; or
   presenting the MRT to all IM receivers of the user.

8. The system according to claim 6, wherein the MRT resources comprise at least one of audio files, video files, text files, images and vCards.

9. The system according to claim 8, wherein the MRT presenting rule set by the setting unit comprises:
- when the MRT resources of the user contain two or more MRTs, selecting an MRT to be presented to the IM receiver in a cycle order in which the MRT resources are stored; or
- when the MRT resources of the user contain two or more MRTs, selecting an MRT to be presented to the IM receiver in the MRT resources in a random order.

10. The system according to claim 6, wherein the MRT resources contain MRTs uploaded to an MRT Server (MRTS) by the user; or
- the MRT resources contain MRTs selected by the user from the MRT resources provided by the MRTS; or
- the MRT resources contain the MRTs uploaded to the MRTS by the user and the MRTs selected from the MRT resources provided by the MRTS.

11. The method according to claim 2, wherein the MRT resources comprise at least one of audio files, video files, text files, images and vCards.

12. The method according to claim 11, wherein the MRT presenting rule of the IM comprises:
- when the MRT resources of the user contain two or more MRTs, selecting an MRT to be presented to the IM receiver in a cycle order in which the MRT resources are stored; or
- when the MRT resources of the user contain two or more MRTs, selecting an MRT to be presented to the IM receiver in the MRT resources in a random order.

13. The system according to claim 7, wherein the MRT resources comprise at least one of audio files, video files, text files, images and vCards.

14. The system according to claim 13, wherein the MRT presenting rule set by the setting unit comprises:
- when the MRT resources of the user contain two or more MRTs, selecting an MRT to be presented to the IM receiver in a cycle order in which the MRT resources are stored; or
- when the MRT resources of the user contain two or more MRTs, selecting an MRT to be presented to the IM receiver in the MRT resources in a random order.

* * * * *